US007804522B2

(12) United States Patent
Haynes

(10) Patent No.: US 7,804,522 B2
(45) Date of Patent: Sep. 28, 2010

(54) IMAGE ANALYSIS FOR SMOKE DETECTION

(75) Inventor: Simon Dominic Haynes, Fleet (GB)

(73) Assignee: Sony United Kingdom Limited, Weybridge (GB)

( * ) Notice: Subject to any disclaimer, the term of this patent is extended or adjusted under 35 U.S.C. 154(b) by 1008 days.

(21) Appl. No.: 11/487,367

(22) Filed: Jul. 17, 2006

(65) Prior Publication Data

US 2007/0019071 A1 Jan. 25, 2007

(30) Foreign Application Priority Data

Jul. 18, 2005 (GB) ................................ 0514688.1

(51) Int. Cl.
*H04N 5/228* (2006.01)
*H04N 5/232* (2006.01)
*G06K 9/00* (2006.01)
*G08B 17/10* (2006.01)

(52) U.S. Cl. ............................ 348/208.15; 348/211.14; 382/103; 340/628

(58) Field of Classification Search ............. 348/82–83, 348/208.14, 208.15, 211.6, 211.11, 211.14; 382/100, 103, 190, 191, 284; 340/628–630
See application file for complete search history.

(56) References Cited

U.S. PATENT DOCUMENTS

| | | | | |
|---|---|---|---|---|
| 7,002,478 | B2 * | 2/2006 | Moore et al. | 340/577 |
| 2002/0024446 | A1 | 2/2002 | Grech-Cini | |
| 2003/0141980 | A1 | 7/2003 | Moore et al. | |
| 2004/0175040 | A1 | 9/2004 | Rizzotti et al. | |
| 2005/0100193 | A1 * | 5/2005 | Privalov | 382/103 |
| 2007/0269078 | A1 * | 11/2007 | Lee | 382/103 |

FOREIGN PATENT DOCUMENTS

| | | |
|---|---|---|
| GB | 2 428 473 A | 1/2007 |
| WO | WO 99/65005 | 12/1999 |

* cited by examiner

*Primary Examiner*—Sinh Tran
*Assistant Examiner*—Daniel M Pasiewicz
(74) *Attorney, Agent, or Firm*—Oblon, Spivak, McClelland, Maier & Neustadt, L.L.P.

(57) ABSTRACT

A smoke detection method for identifying, in a current input image, an area indicative of the presence of smoke, there being a sequence of two or more input images, the method comprising the steps of: storing a background estimation for a current input image; and comparing the current input image with the background estimation to detect a partial obscuring of the background estimation indicative of the presence of smoke in the current input image.

20 Claims, 5 Drawing Sheets

IMAGE ANALYSIS FOR SMOKE DETECTION

BACKGROUND OF THE INVENTION

1. Field of the Invention

This invention relates to smoke detection.

2. Description of the Prior Art

Smoke detection systems are well known. One of the most common methods of detecting smoke (and the most frequently used within buildings, such as a person's home) is to have a local detector that physically detects smoke particles in the air. Such smoke detectors are suited to small indoor environments, where the amount of air to be sampled is relatively small. For a large indoor environment, such as a warehouse, multiple such smoke detectors are required to enable detection of smoke in a sufficiently short time. This is a costly solution and is often not easy to deploy. Furthermore, such smoke detectors are not very well suited to detecting smoke in an outdoor environment, such as a park, a forest or a car park. This is due to a variety of reasons, such as: the vast quantity of air present; the lack of a vertical restraint on the movement of the air; the size of the area to be monitored; and potential air flow dynamics that direct smoke away from one or more of the detectors.

Detection of smoke by video/image processing techniques has also been proposed. For example, areas of an image can be compared with known smoke characteristics via pattern matching techniques to detect smoke. For example, smoke plumes may be detected in this manner. Another proposed method of using video based smoke detection is to detect the diffusion of light from light sources and/or bright objects within the video images to identify a pattern consistent with the slow accumulation of smoke.

SUMMARY OF THE INVENTION

According to an aspect of the invention, there is provided a smoke detection method for identifying, in a current input image, an area indicative of the presence of smoke, there being a sequence of two or more input images, the method comprising the steps of: storing a background estimation for a current input image; and comparing the current input image with the background estimation to detect a partial obscuring of the background estimation indicative of the presence of smoke in the current input image.

Embodiments of the invention make use of the fact that smoke is partially transparent, i.e. smoke partially obscures the scene behind the smoke. An estimate of what constitutes the background of the scene being captured by a video camera (i.e. what would be behind some smoke) is formed. By comparing this background estimate with a current input image, areas of the current input image that are covered by partially transparent smoke can be identified. This provides a smoke detection system with several advantages: early smoke detection is achieved (due to detecting partially transparent smoke); the smoke detection is remote (due to using video processing techniques); and the smoked detection does not rely on specific characteristics of smoke formation (such as plume shape or diffusion of light from a bright source) which may not actually occur (for example, due to physical factors such as wind, buildings, etc.).

Further respective aspects of features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
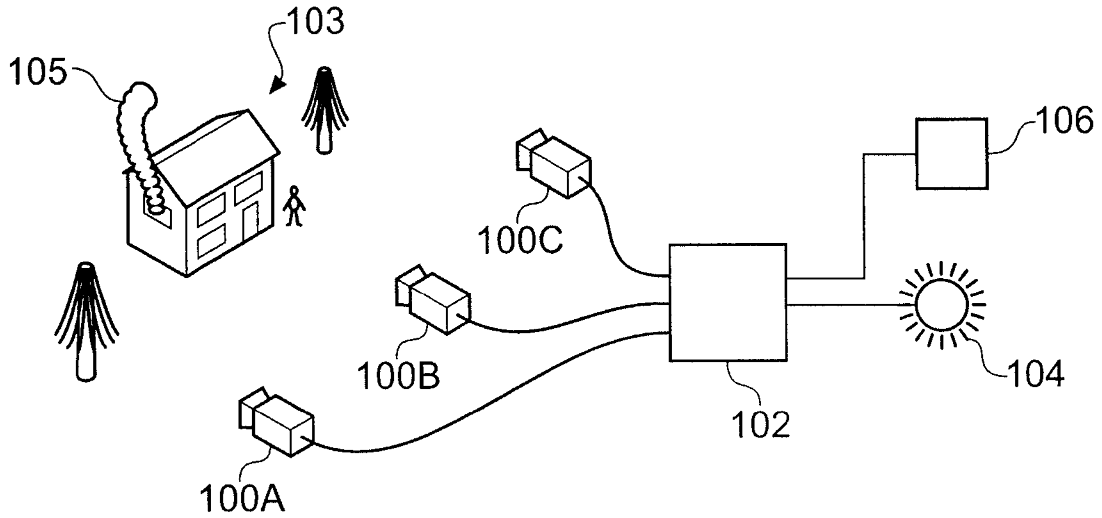
FIG. 1 schematically illustrates a smoke detection system according to an embodiment of the invention.

FIG. 1 schematically illustrates a smoke detection system according to an embodiment of the invention. Three video cameras 100A, 100B, 100C are connected to a video processing unit 102 which analyses the video captured by the video cameras 100 to determine whether the scene 103 that one of the video cameras 100 is arranged to capture contains smoke 105. If the video processing unit 102 determines that the scene 103 contains smoke 105, then the video processing unit 102 triggers an alarm 104. The alarm 104 may be an audible alarm, a visual alarm or an audible and visual alarm. An electronic alarm, such as a pager signal, an email or a short message service (SMS) or voice-based mobile phone message could be used. The smoke detection system shown in FIG. 1 may be arranged such that a human operator is alerted to the possibility of smoke 105 being present in the scene 103 being captured by one of the video cameras 100, in response to which the human operator performs a visual verification himself prior to setting off another (main) alarm, for example to call the emergency services. Additionally, or alternatively, the video processing unit 102 may be connected to a fire extinguisher system 106. The fire extinguisher system 106 may be a fully automatic fire extinguisher system or may be under the control of a human user. The fire extinguisher system 106 may use information provided to it by the video processing unit 102, concerning the location of the smoke 105 within the scene 103, so that a fire generating the smoke 105 may be extinguished.

The smoke detection system shown in FIG. 1 is particularly suitable to outdoor environments where it would be impractical to fit standard smoke detectors which operate by detecting particles of smoke in the air. For example, the smoke detection system shown in FIG. 1 may be used in a car park or around the perimeter of a property as shown in FIG. 1.

The video cameras 100 shown in FIG. 1 may be any ordinary video cameras and need not necessarily be special video cameras such as ultraviolet video cameras or infrared video cameras, i.e. the video cameras 100 may be video cameras that capture light in the visible spectrum. As such, the video cameras 100 may be video cameras of a closed circuit television (CCTV) system that already exists for surveillance purposes, the video outputs of the video cameras 100 being routed to the video processing unit 102 as well as to a pre-existing video surveillance unit (not shown in FIG. 1).

It will be appreciated that the smoke detection system shown in FIG. 1 may make use of any number of video cameras 100.

Figure 2:
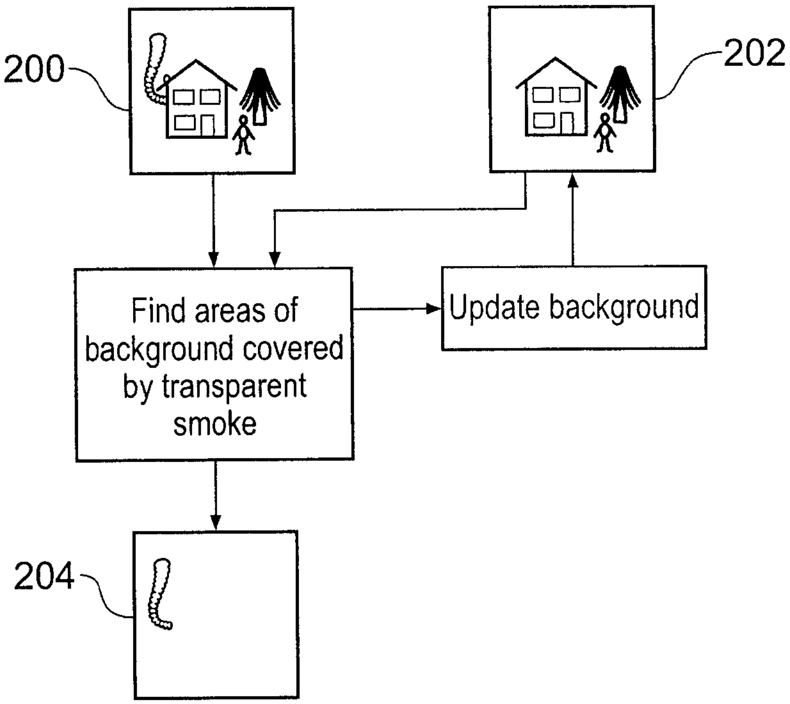
FIG. 2 schematically illustrates an overview of the video processing performed to detect smoke.

FIG. 2 schematically illustrates an overview of the video processing performed by the video processing unit 102 to detect smoke. A current input image 200 from one of the video cameras 100 is received by the video processing unit 102. The video processing unit 102 maintains an estimate 202 of the background of the current input image 200. The background estimate 202 is updated on a regular basis, for example for every input image 200 received by the video processing unit 102. The background estimate 202 is an estimation of the scene 103 as viewed by the video camera 100 when no smoke 105 is present. Therefore, when no smoke 105 is present in the scene 103 being captured by the video camera 100, the current input image 200 should be approximately the same as the background estimate 202.

When smoke 105 is present in the scene 103 being captured by the video camera 100, the current input image 200 will be approximately the same as the background estimate 202 except that some of the areas of the background estimate 202 will be covered by an area representing the partially transparent smoke 105. The video processing unit 102 therefore compares the current input image 200 with the background estimate 202 to try to detect areas of the background estimate 202 that have been covered by an area representing partially transparent smoke 105. This results in a prediction 204 of where smoke 105 may be present in the current input image 200. Given this information, the background estimate 202 may be updated from the current input image 200 but with the smoke 105 removed.

Figure 3:
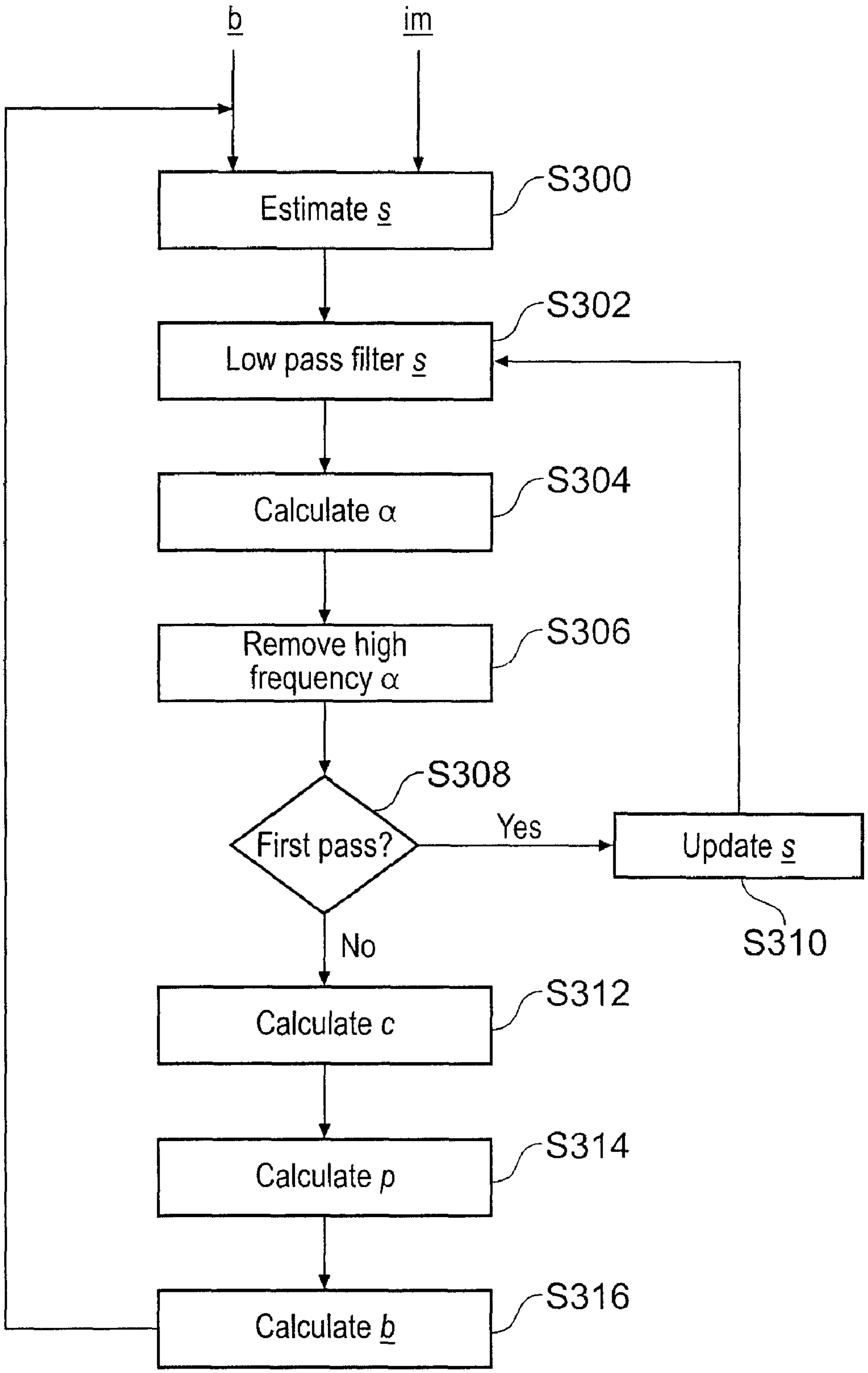
FIG. 3 is a schematic flowchart of the video processing performed to detect smoke.

FIG. 3 is a schematic flowchart of the video processing performed by the video processing unit 102. The video processing unit 102 makes use of a current input image im (corresponding to the current input image 200 of FIG. 2) and a background estimate b (corresponding to the background estimate 202 of FIG. 2). The basic relationship between the current input image im, the background estimate b, a smoke color s and a smoke density α is given in Equation 1 below.

$$im=b*\alpha+s*(1-\alpha) \quad \text{Equation 1}$$

In this embodiment, Equation 1 uses im, b and s to represent values for a pixel location in a respective color image and, as such, im, b and s are vector values having three components. These three components could correspond to red, green and blue components or a luminance and two chrominance components for example. However it will be appreciated that the smoke detection could operate on a single component such as a luminance component in a black and white image. For clarity, the rest of this description will assume that the images being referred to are color images with three color planes. The smoke color s may vary across the image to accommodate spatially changing colors of smoke. Additionally the smoke density α may vary on a pixel-by-pixel basis to accommodate changes in smoke density or thickness. The value of the smoke density α ranges from zero (which represents totally opaque smoke) to a value of one (which represents totally transparent smoke, i.e. no smoke, the background estimate b being identical to the current input image im). However, for a given pixel location, the smoke density α is assumed to be constant across the color planes.

The background estimate b is initialised to an image of the scene 103 known not to contain smoke 105, for example a video frame from the video camera 100 when the scene 103 is known not to contain smoke 105.

At a step S300, the current input image im and the background estimate b are used to produce an initial estimate of the smoke color s. This may be formed in a variety of ways, but in preferred embodiments the value for a pixel location of the smoke color s is set to a value of 1 if the corresponding pixel in the current input im is greater than the corresponding pixel value in the background estimate b; otherwise the value for the pixel location in the smoke color s is set to a value of 0. Note that for the purposes of this description, pixel values lie in the range from 0 to 1. This initial estimation for the smoke color s is derived from Equation 1, namely: when a pixel value of the current input image im is greater than the corresponding pixel value in the background estimate b, then the corresponding smoke color s must be greater than both of these values, and setting the corresponding smoke color s to 1 is certain to meet this criteria; whereas when a pixel value of the current input image im is less than or equal to the corresponding pixel value in the background estimate b then the corresponding smoke color s must be less than or equal to both of these values, and setting the corresponding smoke color s to 0 is certain to meet this criteria.

At a step S302, the initial estimate for the smoke color s is low pass filtered to remove any high frequencies from the initial estimate for s. This is performed as it is assumed that the color of the smoke 105 is largely constant and will only change slowly over the current input image im.

At a step S304, Equation 1 is used to calculate an initial value for the smoke density α. To do this, Equation 1 can be re-arranged into Equation 2 below.

Equation 2:

$$\alpha = \frac{\underline{im} - \underline{s}}{\underline{b} - \underline{s}}$$

As Equation 1 uses im, b and s as three dimensional vectors, a value for the smoke density α is calculated for each of the corresponding color planes. As it is assumed that the smoke density α will be consistent across all color planes, a single value for the smoke density α is calculated from each of the initial color plane specific values for the smoke density α, for example by averaging them.

At a step S306, the high frequencies are removed from the smoke density α. This is performed as it is assumed that the smoke density α will only very slowly across the image.

At this stage, the smoke color s has currently only been estimated very crudely. Therefore, at a step S308, it is determined whether the smoke color s needs to be updated. If the smoke color s needs to be updated (i.e. this is the first time that the processing has reached the step S308 for this current input image im) then processing proceeds to a step S310 at which an improved estimate for the smoke color s is generated using Equation 3 below (which is a re-arrangement of Equation 1).

Equation 3:

$$\underline{s} = \frac{\underline{im} - \underline{b} * \alpha}{1 - \alpha}$$

Processing then resumes at the step S302 so that the improved estimate for the smoke color s is low pass filtered (at the step S302), a new estimate for the smoke density α is generated (at the step S304) and then the high frequencies are removed from the newly generated smoke density α (at the step S306).

It will be appreciated that embodiments of the invention may by-pass the removal of the high frequencies from one or more of: the initial estimate for the smoke color s; the initial smoke density α; the improved estimate for the smoke color s; and the new estimate for the smoke density α.

When processing returns to the step S308, the smoke color s no longer needs to be updated and processing continues at a step S312. At the step S312, a correlation map c between the current input image im and the background estimate b is generated. As smoke mainly effects the low frequencies in an image, the correlation is calculated using the high frequency components of the current input image im and the background estimate b. The correlation map c is calculated according to Equation 4 below.

Equation 4:

$$c = \sum_{col=1}^{3} \sqrt[3]{\frac{f(\underline{im}_{hp} * \underline{b}_{hp})}{\sqrt{f(\underline{im}_{hp} * \underline{im}_{hp}) * f(\underline{b}_{hp} * \underline{b}_{hp})}}}$$

$$\underline{im}_{hp} = \underline{im} - f(\underline{im})$$

where $$\underline{b}_{hp} = \underline{b} - f(\underline{b})$$

$f$ = low pass filter

The summation is across the three color components in this example.

Processing continues at a step S314 at which a probability map p (i.e. a set of probability values, such as one per pixel position) is generated. The probability map p is generated according to Equation 5 below.

Equation 5:

$$p = c^2 * (1 - \alpha) * (1 - \mathrm{abs}(c - \alpha)) * \sum_{col=1}^{3} (\underline{s} - \underline{im})$$

As can be seen, the probability map p will assume a large value at a given pixel location if:

1) there is a large degree of correlation between the current input image im and the background estimate b (as represented by a large value of the correlation map c); and
2) the smoke density α is close to zero; and
3) the correlation map c is close to the smoke density α; and
4) the current input image im is sufficiently different from the smoke color s.

It will be appreciated that a different version of Equation 5 may be used. For example, one or more of the four multiplication terms may be omitted from Equation 5. Additionally, one or more of the terms may be weighted in order to provide a greater degree is significance to one or more specific factors, given the particular requirements of the smoke detection system being employed.

As can be seen from Equation 5, there are several competing factors contributing to the probability map p. For example, as the smoke density α decreases the (1−α) term becomes larger whilst the correlation map c will be reduced (as there is less correlation between the background estimate b and the current input image im). Additionally, for almost opaque smoke, the value of the smoke density α must be close to 0, which means that the current input image im becomes close to the smoke color s (Equation 1). However this conflicts with the requirements that the current input image im must be sufficiently different from the smoke color s. These competing factors are required though to ensure that:

a) the current input image im is sufficiently similar to the background estimate b so that any differences are know not to be a non-transparent object; and
b) the current input image im is sufficiently different to the background estimate b so that a degree of certainty can be achieved that there is really some smoke 105 present in the scene 103 being captured by the video camera 100.

At a step S316, the background estimate b is updated. The process of updating the background estimate b will be described in more detail later.

The values of the probability map p may then be compared to a threshold probability so that if one or more (or at least a sufficient number) of these values exceeds a threshold probability, then the video processing unit 102 activates the alarm 104 and/or the fire extinguishing system 106.

Figure 4:
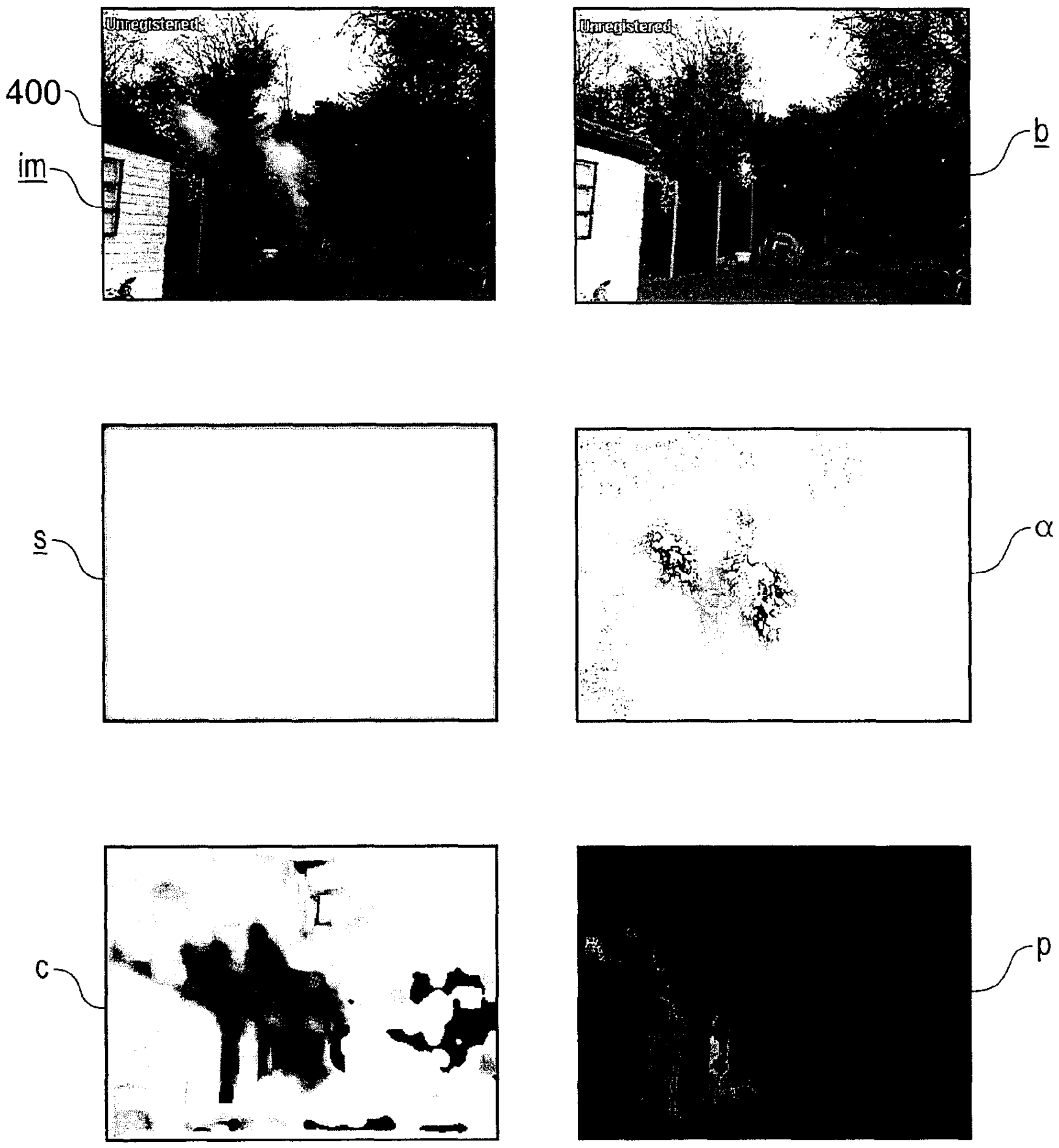
FIG. 4 illustrates example images generated by the video processing according to the flowchart shown in FIG. 3.

FIG. 4 illustrates example images generated by the processing according to the flowchart shown in FIG. 3. An area of smoke 400 in the current input image im is clearly visible when compared to the background estimate b.

Figure 5:
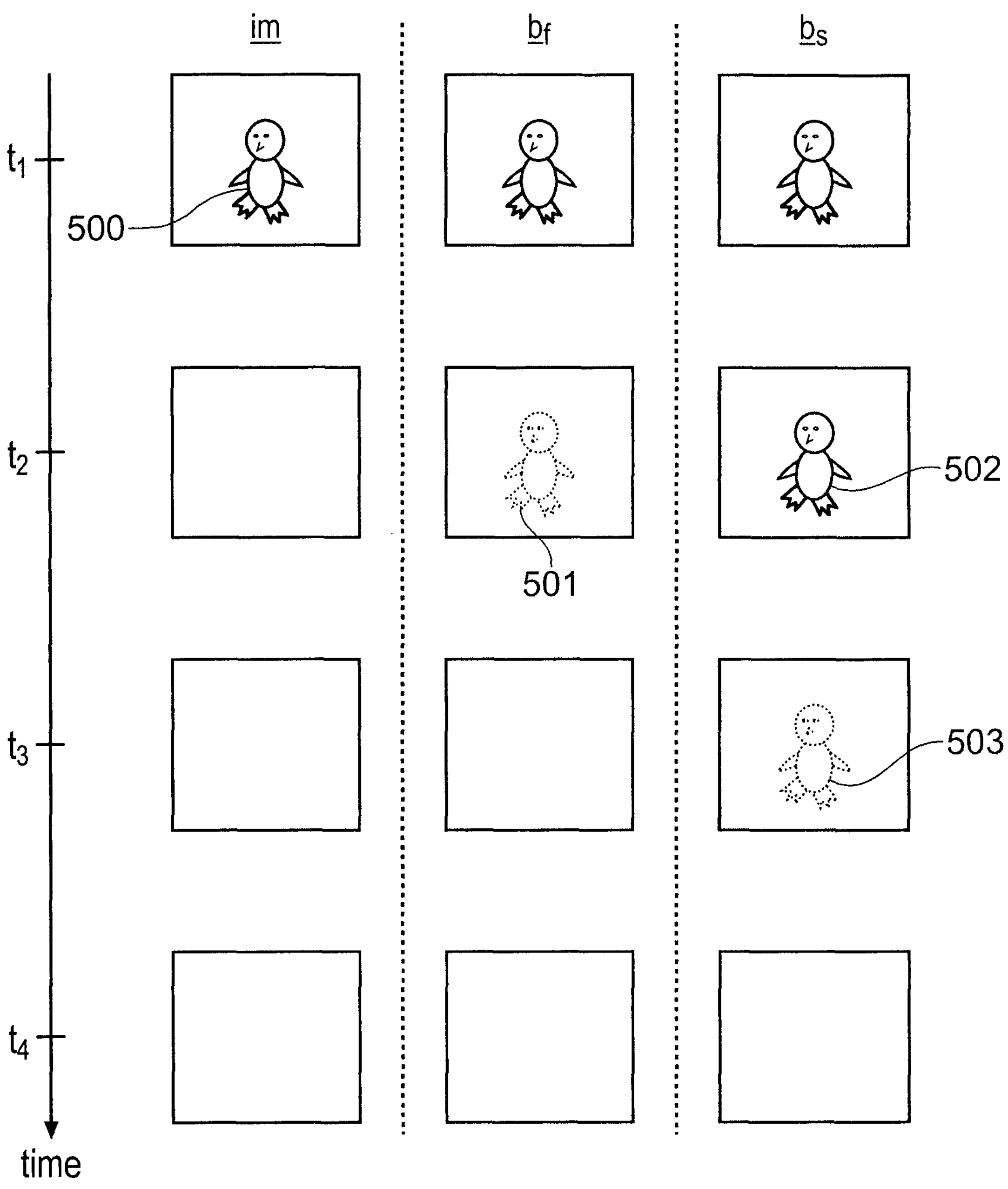
FIGS. 5 and 6 schematically illustrate a method of updating a background estimate.

FIG. 5 schematically illustrates a method of updating the background estimate b. The background estimate b is updated in dependence upon the current background estimate b, the current input image im and a reconstructed background rb. This is performed according to Equation 6 below.

$$b' = u*\mathrm{im} + v*rb + w*bu + v + w = 1 \qquad \text{Equation 6}$$

The reconstructed background rb is generated from Equation 7 below (which is a rearrangement of Equation 1).

Equation 7:

$$\underline{rb} = \frac{\underline{im} - \underline{s} * (1 - \alpha)}{\alpha}$$

As can be seen, the updated background estimate is a linear combination of the reconstructed background estimate rb, the current input image im and the current background estimate b. In preferred embodiments, the contributions from the current input image im and the reconstructed background rb are smaller than the contribution from the current background estimate b. This causes the background estimate b to be updated slowly. The reason for doing this is that the scene 103 behind the smoke 105 can be assumed to be largely static. The reason for not simply setting the updated background estimate b' to be the reconstructed background rb is that there may be moving objects in the foreground which could cause the updating to diverge, i.e. the background estimate b would become worse and worse.

Account must be taken of the situation when a new object appears in the scene 103 or an object is removed from the scene 103. Due to the slowly updating nature of the background estimate b, this newly appearing or disappearing object can appear to be smoke 105.

Preferred embodiments address this problem by using two or more background estimates b, each of which updates at a different rate to the other background estimates.

FIG. 5 shows three columns of images: the left column represents a time series of current input images im; the middle column represents a time series of background estimates $b_f$ for a fast updating background estimate; and the right column represents a time series of background estimates $b_s$ for a slowly updating background estimate. The fast updating background estimates $b_f$ and the slow updating background estimates $b_s$ are calculated using versions of Equation 6 with appropriate multiplication constants. Preferred embodiments use Equations 8 and 9 below for updating the fast updating background estimates $b_f$ and the slow updating background estimates $b_s$ respectively.

$$b' = 0.0475*\mathrm{im} + 0.0025*rb + 0.95*b \qquad \text{Equation 8}$$

$$b' = 0.00095*\mathrm{im} + 0.00005*rb + 0.999*b \qquad \text{Equation 9}$$

Whilst FIG. 5 shows the use of two background estimates, it will be appreciated that more than two background estimates may be used to address the problem that newly introduced or removed objects appear to be smoke 105.

The use of multiple background estimates updating at different rates works as an object is either entirely visible in one of the background estimates and fading in another or is entirely removed from one of the background estimates and fading in another. When generating the probability map p, each of the background estimates is used and the minimum probability is taken on a pixel-by-pixel basis.

FIG. 5 shows how using multiple background estimates works in practice, when removing an object 500 from the scene 103. At a time $t_1$, the object 500 is present in the scene 103 being captured by the video camera 100 and consequently appears in the corresponding current input image im. As the object 500 has been present in the scene for some time, the object 500 also appears in the background estimates $b_f$ and $b_s$ at time $t_1$. At the next frame (at time $t_2$), the object 500 has been removed from the scene 103 and is therefore no longer present in the current input image im. As the contribution from the current input image im is larger when updating the fast updating background estimate $b_f$ than when updating the slow updating background estimate $b_s$ (see Equations 8 and 9), the object 500 now appears as a faint object 501 in the fast updating background estimate $b_f$ whilst it appears as a more solid object 502 in the slow updating background estimate $b_s$. At the next frame (at time $t_3$), the object 501 has disappeared from fast updating background estimate $b_f$ whilst the object 500, 502 appears as a faint object 503 in the slow updating background estimate $b_s$. At the next frame (at time $t_4$), the object 500 has disappeared entirely from both of the background estimates $b_f$, $b_s$.

When computing the probability map p at time $t_2$, the presence of the solid object 502 in the slow updating background estimate $b_s$ will result in a low probability for smoke detection and therefore prevents the faint object 501 in the fast updating background estimate $b_f$ from providing a high probability of smoke. Similarly, at the time $t_3$, the complete absence of the object 500 in the fast updating background estimate $b_f$ will result in a low probability of smoke detection, thereby avoiding a higher probability of smoke detection caused by the faint object 503 in the slow updating background estimate $b_s$.

Figure 6:
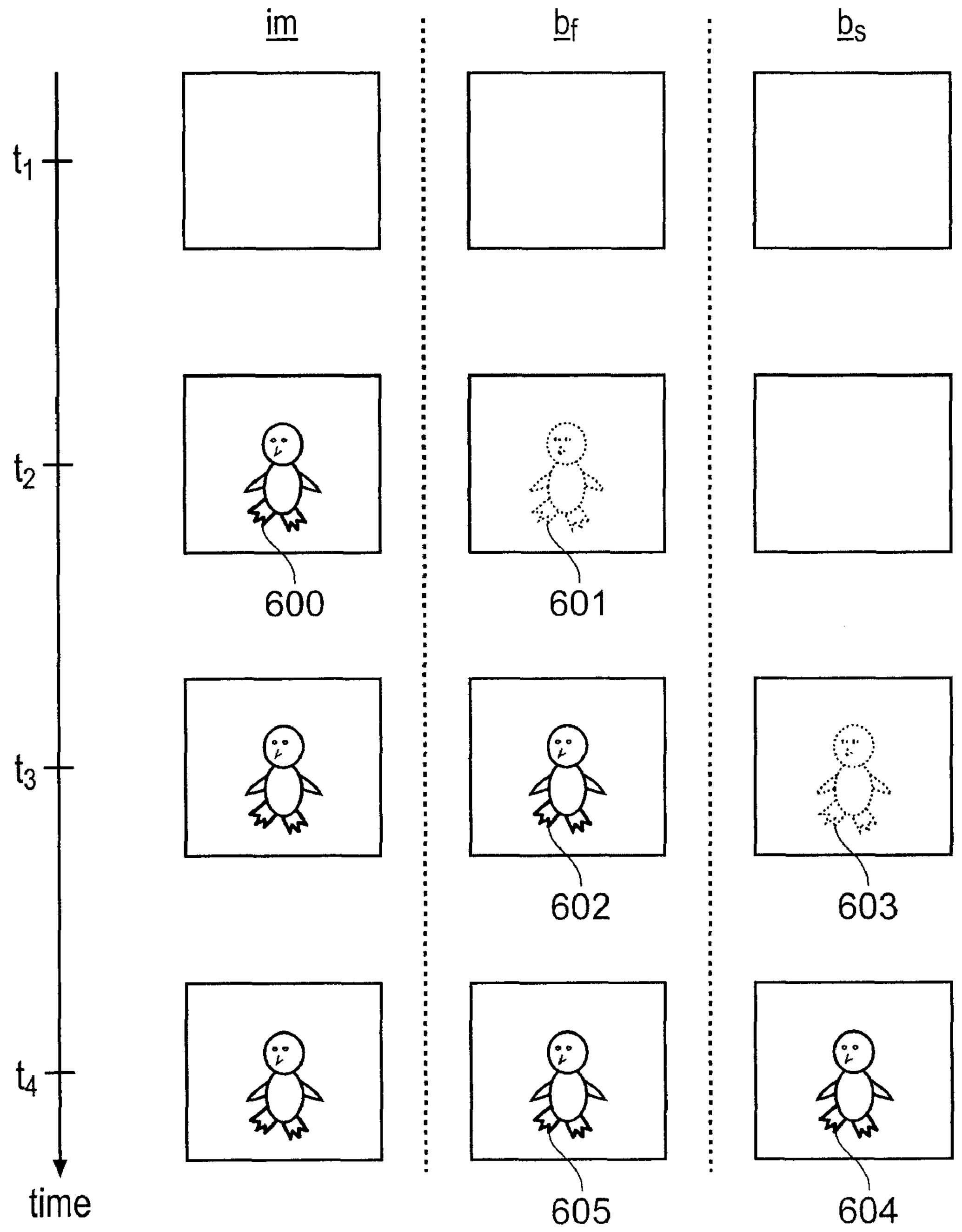

FIG. 6 schematically illustrates a method of updating the background estimate b when an object 600 is introduced into the scene 103. At a time $t_1$, the object 600 is not present in the scene 103 being captured by the video camera 100 and consequently does not appear in the corresponding current input image im. The object 600 therefore does not appear in the background estimates $b_f$ and $b_s$ at time $t_1$. At the next frame (at time $t_2$), the object 600 has been introduced into the scene 103 and is therefore present in the current input image im. As the contribution from the current input image im is larger when updating the fast updating background estimate $b_f$ than when updating the slow updating background estimate $b_s$ (see Equations 8 and 9), the object 600 now appears as a faint object 601 in the fast updating background estimate $b_f$ whilst it hardly appears at all in the slow updating background estimate $b_s$. At the next frame (at time $t_3$), the object 601 now appears as a more solid object 602 in fast updating background estimate $b_f$ whilst the object 600 appears as a faint object 603 in the slow updating background estimate $b_s$. At the next frame (at time $t_4$), the object 600 appears as a more solid object 604, 605 in both of the background estimates $b_f$, $b_s$.

When computing the probability map p at time $t_2$, the absence of any object in the slow updating background estimate $b_s$ will result in a low probability for smoke detection and therefore prevents the faint object 601 in the fast updating background estimate $b_f$ from providing a high probability of smoke. Similarly, at the time $t_3$, the presence of the more solid object 602 in the fast updating background estimate $b_f$ will result in a low probability of smoke detection, thereby avoiding a higher probability of smoke detection caused by the faint objection 603 in the slow updating background estimate $b_s$.

Preferred embodiments perform one or more extra stages of processing in order to help improve the smoke detection results. One of these stages includes masking (or excluding) certain pixels from the smoke detection calculations. For example, in order to remove the adverse effects that saturated pixel values can have on the smoke detection calculations, pixel values taking a maximum or a minimum possible value are excluded from the smoke detection calculation. It will be appreciated that pixel values at or near the maximum or the minimum possible pixel value could also be excluded. Other pixels could also be excluded for other reasons. For example, the background estimate b could be analysed to determine areas of low detail, these areas being excluded from the smoke detection calculation. It will be appreciated that the masking could be performed based on pixel values either in the current input image im or the background estimate b.

Another extra processing stage which preferred embodiments apply is gamma correction. This is performed to remove all gamma effects from the current input image im so that the processing is performed in the linear light domain. Gamma correction is performed according to Equation 10 below.

$$im_{out}=im_{in}^{2.2} \quad \text{Equation 10}$$

Another processing stage which preferred embodiments apply is contrast correction. It is often the case that the video camera 100 performs automatic contrast adjustment, for example when the sun moves behind a cloud. The general form of the equation for correcting contrast is given in Equation 11 below.

$$im_{out}=k_{contrast}*im_{in} \quad \text{Equation 11}$$

An estimate for the contrast adjustment parameter $k_{contrast}$ is generated from the current input image im and the background estimate b according to Equation 12 below.

Equation 12:

$$k_{constrast} = \frac{\sum\left(c * \sum_{col=1}^{3} \frac{im}{b}\right)}{3\sum c}$$

In Equation 12, the summation where col ranges from 1 to 3 is across the color planes; the other summations are across all pixels in the correlation map c. Preferred embodiments also reject pixels where $k_{contrast}$ is not approximately equal across all 3 color planes.

The reason for including the correlation map c in Equation 12 is that this weights areas of the current input image im more heavily where it correlates with the background estimate b. This prevents $k_{contrast}$ becoming overly affected by new objects appearing in the scene 103.

Finally, the smoke detection results produced by embodiments of the invention may be combined with fire/flame detection probabilities output by a fire detection system. An example of a suitable fire detection system is provided in co-pending application number 0514706.1. This fire detection system outputs a probability map for whether a current input image im represents a fire/flame. This probability map may be combined with the probability map p to provide an overall smoke-and-flame-probability-map (for example by simple multiplication of the two probability maps).

The smoke detection performed by the video processing apparatus 102 may be undertaken in software, hardware or a combination of hardware and software. Insofar as the embodiments of the invention described above are implemented, at least in part, using software control data processing apparatus, it will be appreciated that a computer program providing such software control and a storage medium by which such a computer program is stored, are envisaged as aspects of the invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the spirit and scope of the invention as defined by the appended claims.

I claim:

1. A smoke detection method for identifying, in a current input image, an area indicative of a presence of smoke, there being a sequence of two or more input images, said method comprising:

initializing a background estimation as one of said input images;

comparing said current input image with said background estimation to detect a partial obscuring of said background estimation indicative of the presence of smoke in said current input image;

forming an estimate of a color of and a degree of said partial obscuring of said background estimation in dependence on said current input image and said background estimation;

updating said background estimation in accordance with said current input image and said background estimation; and forming a reconstructed background from said current input image, said estimate of said color of said partial obscuring of said background estimation and said estimate of said degree of said partial obscuring of said background estimation, said updating said background estimation comprising forming a linear combination of said current input image, said background estimation and said reconstructed background estimation.

2. The method according to claim 1, comprising:

removing high frequencies from said estimate of said color of said partial obscuring of said background estimation and/or the degree of said partial obscuring of said background estimation.

3. The method according to claim 1, in which two or more background estimations of said current input image are stored, updating said background estimations being arranged such that said current input image contributes to each of said updated background estimations to different respective degrees, said comparing comprising comparing said current input image with each of said background estimations.

4. The method according to claim 1, in which said comparing comprises:

correlating high frequency content of said current input image with high frequency content of said background estimation.

5. The method according to claim 4, comprising:

forming a smoke probability map in dependence upon the comparison of said current input image and said background estimation, each value of said smoke probability map indicating a probability that a corresponding location in said current input image is indicative of the presence of smoke.

6. The method according to claim 5, in which said smoke probability map is dependent upon one or more of said correlation, said estimate of said color of said partial obscuring of said background estimation and said estimate of said degree of said partial obscuring of said background estimation.

7. The method according to claim 5, comprising:

triggering an alarm if one or more of said smoke probability map values exceeds a threshold value.

8. The method according to claim 1, in which, in said comparing, if a value at a location in said current input image and/or in said background estimation is a predetermined value, then said comparison does not involve using that location.

9. The method according to claim 1, comprising:

removing, from said current input image, non-linear response effects introduced into said current input image when said current input image was generated.

10. The method according to claim 1, comprising:

balancing a contrast of said current input image and said background estimation.

11. The method according to claim 1, in which said input images represent light in a visible spectrum.

12. The method according to claim 1, comprising:

receiving said sequence of two or more input images from a video camera.

13. The method according to claim 1, wherein said updated background estimation includes the current input image and said background estimation.

14. A smoke detector that identifies, in a current input image, an area indicative of the presence of smoke, there being a sequence of two or more input images, said detector comprising:

a memory that stores a background estimation as one of said input images;

a comparator that compares said current input image with said background estimation to detect a partial obscuring of said background estimation indicative of the presence of smoke in said current input image, an estimator that forms an estimate of a color of and a degree of said partial obscuring of said background estimation in dependence on said current input image and said background estimation;

an updating unit that updates said background estimation in accordance with said current input image and said background estimation; and a reconstructing unit that forms a reconstructed background from said current input image, said estimate of said color of said partial obscuring of said background estimation and said estimate of said degree of said partial obscuring of said background estimation, said updating said background estimation comprising forming a linear combination of said current input image, said background estimation and said reconstructed background estimation.

15. A smoke detection system comprising:

a video camera; and a smoke detector according to claim 14 operable to receive said sequence of two or more input images from said video camera.

16. A non-transitory computer-readable medium having stored thereon computer program code that when executed by a computer causes a processor of the computer to execute a smoke detection method for identifying, in a current input image, an area indicative of the presence of smoke, there being a sequence of two or more input images, said method comprising:

initializing a background estimation as one of said input images;

comparing said current input image with said background estimation to detect a partial obscuring of said background estimation indicative of the presence of smoke in said current input image;

forming an estimate of a color of and a degree of said partial obscuring of said background estimation in dependence on said current input image and said background estimation;

updating said background estimation in accordance with said current input image and said background estimation; and forming a reconstructed background from said current input image, said estimate of said color of said partial obscuring of said background estimation and said estimate of said degree of said partial obscuring of said background estimation, said updating said background estimation comprising forming a linear combination of said current input image, said background estimation and said reconstructed background estimation.

17. The computer-readable medium according to claim 16, wherein said computer-readable medium is a storage medium.

18. A smoke detection method for identifying, in a current input image, an area indicative of a presence of smoke, there being a sequence of two or more input images, said method comprising:

initializing a background estimation as one of said input images;

comparing said current input image with said background estimation to detect a partial obscuring of said background estimation indicative of the presence of smoke in said current input image;

forming an estimate of a color of and a degree of said partial obscuring of said background estimation in dependence on said current input image and said background estimation;

updating said background estimation in accordance with said current input image and said background estimation;

updating said background estimations being arranged such that said current input image contributes to each of said updated background estimations to different respective degrees, said comparing comprising comparing said current input image with each of said background estimations; and forming a smoke probability map in dependence upon a comparison of said current input image and said background estimation, each value of said smoke probability map indicating a probability that a corresponding location in said current input image is indicative of the presence of smoke, in which a value of said smoke probability map is derived from said background estimation that results in a lowest probability.

19. A smoke detector that identifies, in a current input image, an area indicative of the presence of smoke, there being a sequence of two or more input images, said detector comprising:

a memory that stores a background estimation as one of said input images;

a comparator that compares said current input image with said background estimation to detect a partial obscuring of said background estimation indicative of the presence of smoke in said current input image, an estimator that forms an estimate of a color of and a degree of said partial obscuring of said background estimation in dependence on said current input image and said background estimation;

an updating unit that updates said background estimation in accordance with said current input image and said background estimation;

the updating unit further updates said background estimations being arranged such that said current input image contributes to each of said updated background estimations to different respective degrees, said comparing comprising comparing said current input image with each of said background estimations a mapping unit that forms a smoke probability map in dependence upon a comparison of said current input image and said background estimation, each value of said smoke probability map indicating a probability that a corresponding location in said current input image is indicative of the presence of smoke, in which a value of said smoke probability map is derived from said background estimation that results in a lowest probability.

20. A non-transitory computer-readable medium having stored thereon computer program code that when executed by a computer causes a processor of the computer to execute a smoke detection method for identifying, in a current input image, an area indicative of the presence of smoke, there being a sequence of two or more input images, said method comprising:

initializing a background estimation as one of said input images;

comparing said current input image with said background estimation to detect a partial obscuring of said background estimation indicative of the presence of smoke in said current input image;

forming an estimate of a color of and a degree of said partial obscuring of said background estimation in dependence on said current input image and said background estimation;

updating said background estimation in accordance with said current input image and said background estimation;

updating said background estimations being arranged such that said current input image contributes to each of said updated background estimations to different respective degrees, said comparing comprising comparing said current input image with each of said background estimations; and forming a smoke probability map in dependence upon a comparison of said current input image and said background estimation, each value of said smoke probability map indicating a probability that a corresponding location in said current input image is indicative of the presence of smoke, in which a value of said smoke probability map is derived from said background estimation that results in a lowest probability.

* * * * *